(12) United States Patent
Park et al.

(10) Patent No.: US 9,137,782 B2
(45) Date of Patent: Sep. 15, 2015

(54) WIRELESS COMMUNICATION METHOD, AND WIRELESS COMMUNICATION DEVICE AND SYSTEM USING THE SAME

(75) Inventors: Chan-sub Park, Incheon (KR); Hae-joo Jeong, Seoul (KR); June-hee Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 586 days.

(21) Appl. No.: 12/697,843

(22) Filed: Feb. 1, 2010

(65) Prior Publication Data

US 2010/0216480 A1   Aug. 26, 2010

(30) Foreign Application Priority Data

Feb. 26, 2009   (KR) .................. 10-2009-0016472

(51) Int. Cl.
*H04W 72/00* (2009.01)
*H04W 72/02* (2009.01)
*H04W 16/14* (2009.01)

(52) U.S. Cl.
CPC .............. *H04W 72/02* (2013.01); *H04W 16/14* (2013.01)

(58) Field of Classification Search
CPC ...... H04W 72/00; H04W 76/02; H04W 72/04
USPC ................ 455/450, 575.1, 463; 370/230, 433
See application file for complete search history.

(56) References Cited

U.S. PATENT DOCUMENTS

| 6,882,851 | B2 * | 4/2005 | Sugar et al. ................... 455/454 |
| 8,060,104 | B2 * | 11/2011 | Chaudhri et al. .......... 455/452.1 |
| 2006/0229029 | A1 * | 10/2006 | Waltho et al. ................... 455/73 |
| 2008/0130519 | A1 * | 6/2008 | Bahl et al. ..................... 370/254 |
| 2009/0196180 | A1 * | 8/2009 | Bahl et al. ..................... 370/235 |

FOREIGN PATENT DOCUMENTS

| GB | 2449225 A | * 11/2008 |
| KR | 10-2008-0025592 A | 3/2008 |
| KR | 10-2008-0092950 A | 10/2008 |

OTHER PUBLICATIONS

Communication issued on Jan. 27, 2015 by the Korean Intellectual Patent Office in related application No. 1020090016472.

* cited by examiner

*Primary Examiner* — Chuck Huynh
(74) *Attorney, Agent, or Firm* — Sughrue Mion, PLLC

(57) ABSTRACT

A wireless communication method in a cognitive radio (CR) environment, and a wireless communication device and a wireless communication system using the same are provided. A communication method includes receiving channel information indicating a channel used by an external device, searching for available channels, and performing communication through the available channel. Accordingly, interference between devices can be avoided, available channels can be found more rapidly, and wireless resources can be used more efficiently.

13 Claims, 8 Drawing Sheets

WIRELESS COMMUNICATION METHOD, AND WIRELESS COMMUNICATION DEVICE AND SYSTEM USING THE SAME

CROSS-REFERENCE TO RELATED APPLICATIONS

This application claims priority from Korean Patent Application No. 10-2009-0016472, filed on Feb. 26, 2009, in the Korean Intellectual Property Office, the disclosure of which is incorporated herein by reference in its entirety.

BACKGROUND

1. Field

Apparatuses and methods consistent with the exemplary embodiments of the present invention relate to a wireless communication method, and a wireless communication device and a wireless communication system using the same, and more particularly, to a wireless communication method in a cognitive radio (CR) environment, and a wireless communication device and a wireless communication system using the same.

2. Description of the Related Art

Recently, as a variety of wireless communication technologies have been developing rapidly, available frequency bands have been almost saturated.

In order to solve lack of such a wireless resource, technology regarding cognitive radio (CR) has been discussed. The CR technology is that through time/space examination of frequency channels assigned to primary users, frequency channels which are not in use are found and a secondary user uses the available frequency channel avoiding interference with primary users so that wireless resources can be shared and efficiency of wireless resources can be raised.

In addition to efficiently using wireless resources, the CR technology has advantages that a cost is reduced compared to an existing wireless communication service by using a frequency band without detrimental effects and that high-speed data can be efficiently transmitted without frequency interference.

However, in the CP technology, since an available frequency band is searched for from among a wide range of frequency bands, it takes a long time to search for it. In addition, in the CP technology, even when an available frequency band is searched for, it has to be sensed whether a primary user having priority is present or not, so it takes a long time and algorithm may be complicated.

Therefore, there is a need for methods to search for available frequency bands more rapidly and simply.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a wireless communication method in a cognitive radio (CR) environment so as to reduce a time taken to search a frequency band for an available channel, and a wireless communication device and a wireless communication system using the same.

According to an exemplary aspect of the present invention, there is provided a communication method including receiving channel information indicating a channel used by at least one external device in a frequency band assigned to the at least one external device, searching for available channels in a portion of a preset frequency band with reference to the channel information, and performing communication through the available channel.

The searching operation may include searching for the available channels in the preset frequency band except for the frequency band assigned to the at least one external device.

The receiving operation may include receiving the channel information from the at least one external device through a channel which is not used by the at least one external device in the frequency band assigned to the at least one external device.

The receiving operation may include receiving the channel information from the at least one external device when the channel used by the at least one external device changes.

The communication method may further include generating information on the available channels which change over time based on the channel information, wherein the communicating operation comprises performing communication by changing a channel in use using the information on the available channels.

The communicating operation may include performing communication by changing the channel in use to one of the available channels.

The channel used by the at least one external device may vary according to a region, and the receiving operation may include receiving channel information for a current region through the Internet.

The at least one external device may include a television (TV) or a radio.

According to another exemplary aspect of the present invention, there is provided a wireless communication device including a communication unit which receives channel information indicating a channel used by at least one external device in a frequency band assigned to the at least one external device, and a control unit which searches for available channels in a portion of a preset frequency band with reference to the channel information.

The control unit may search for the available channels in the preset frequency band except for the frequency band assigned to the at least one external device.

The control unit may receive the channel information from the at least one external device through a channel which is not used by the at least one external device in the frequency band assigned to the at least one external device.

When the channel used by the at least one external device changes, the external device may transmit the channel information to the wireless communication device.

The wireless communication device may further include an available channel information generation unit which generates information on the available channels which change over time based on the channel information, wherein the control unit sets a channel to be used by wireless communication device using the information on the available channels.

The control unit may set one of the available channels as the channel to be used by wireless communication device.

The wireless communication device may further include an Internet interface through which the wireless communication device accesses the Internet, wherein the channel used by the at least one external device varies according to a region, and the control unit receives channel information for a current region through the Internet.

The at least one external device may include a television (TV) or a radio.

According to another exemplary aspect of the present invention, there is provided a wireless communication device including a channel information generation unit which generates channel information indicating a channel in use in an assigned frequency band, and a control unit which if a channel information transmission request is received from a cognitive radio (CR) device which performs communication using white space which is not used by at least one external device in a frequency band assigned to the at least one external device, transmits the channel information to the CR device.

According to another exemplary aspect of the present invention, there is provided a wireless communication system including at least one first device which generates channel information indicating a channel in use in an assigned frequency band, and transmits the channel information if a channel information transmission request is received, and at least one second device which transmits the channel information transmission request to the at least one first device, and changes a channel to be used based on the channel information received from the at least one first device.

According to another exemplary aspect of the present invention, there is a wireless communication method including receiving channel information indicating at least one channel used by an external device, in a frequency band assigned to the external device, generating available channel information comprising information on a plurality of available channels according to a plurality of time periods, and selecting one of the plurality of available channels to minimize an amount of channel switching.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 1A:
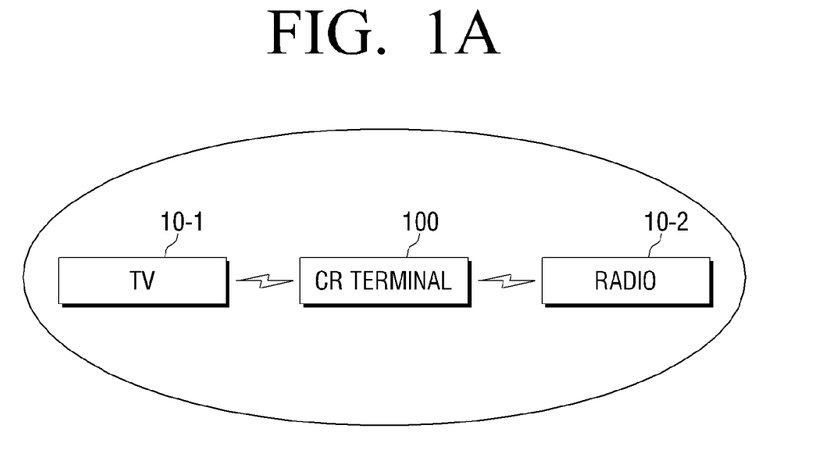
FIGS. 1A and 1B illustrate a wireless communication system according to an exemplary embodiment of the present invention.
Figure 1B:
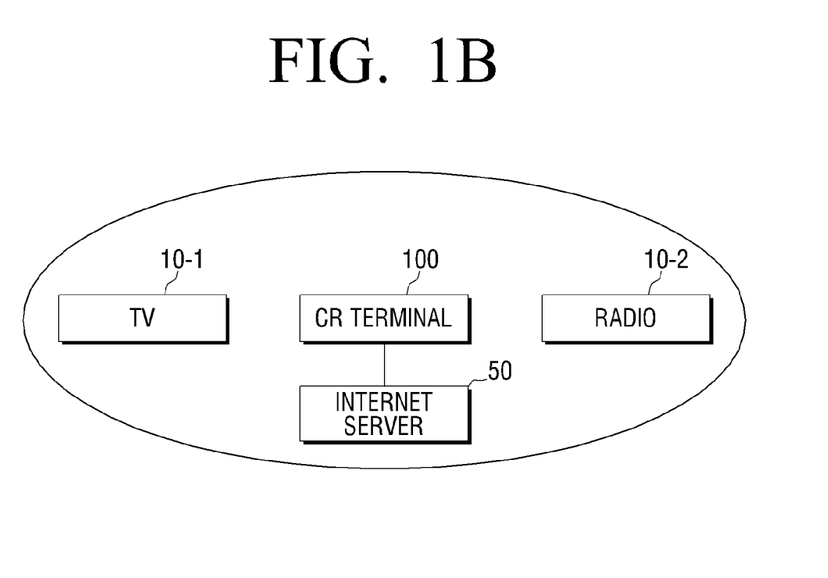

FIGS. 1A and 1B illustrate a wireless communication system according to an exemplary embodiment of the present invention. In the wireless communication system according to an exemplary embodiment of the present invention, different frequency bands or different channels are used, so interference between devices does not occur.

The wireless communication system may include a television (TV) 10-1, a radio 10-2, and a cognitive radio (CR) terminal 100. The TV 10-1 and the radio 10-2 receive signals from a TV broadcast station (not shown) and a radio broadcast station (not shown) using frequency bands assigned according to a country or region frequency policy, and provide a user with TV and radio broadcast services.

The TV 10-1 and the radio 10-2 uses wireless resources in a band assigned to the TV 10-1 and the radio 10-2, respectively, and are thus called "primary users." In FIGS. 1A and 1B, the TV 10-1 and the radio 10-2 are illustrated as primary users, but the primary users are not limited thereto. Any device having an assigned band and channel can be a primary user.

The CR terminal 100 is a device having no specific assigned band so as to efficiently use limited frequency resources. The CR terminal 100 examines frequency bands or channels assigned to the primary users in time and space aspects, searches for a frequency which is not in use, and uses the found frequency without giving interference to the primary users.

In order to obtain information on channels used by the primary users (referred to hereinafter as the "channel information"), the CR terminal 100 communicates with the primary users and receives the channel information from the primary users as illustrated in FIG. 1A, or the CR terminal 100 accesses an Internet server and receives channel information as illustrated in FIG. 1B.

As illustrated in FIG. 1A, if the CR terminal 100 receives the channel information from the primary users, the CR terminal 100 does not need to access the Internet and can receive the channel information even when having trouble to access the Internet. On the contrary, as illustrated in FIG. 1B, if the CR terminal 100 accesses an Internet server and receives channel information, the CR terminal 100 does not need to communicate with the primary users and thus can receive the channel information with greater ease and greater convenience. In addition, the CR terminal 100 can also obtain channel information from primary users having no communication unit.

The CR terminal 100 directly searches frequency bands other than the frequency bands assigned to the primary users, and frequency bands which are assigned to the primary users but through which primary users does not transmit channel information, so that available channels can be searched for.

Hereinafter, a process of searching for an available channel using channel information is described with reference to FIGS. 2A to 2F, which are provided to explain channel information.

Figure 2A:
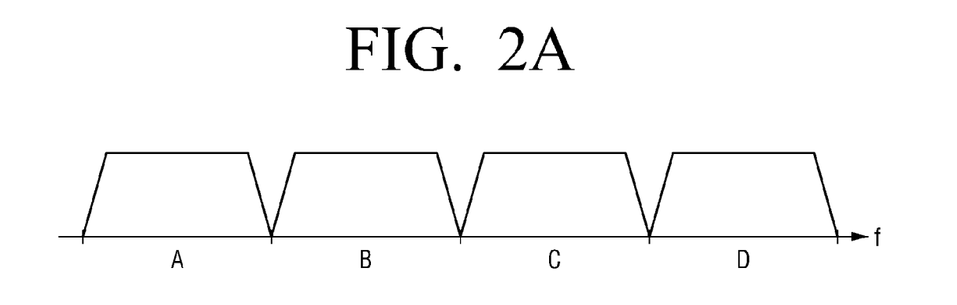
FIGS. 2A to 2F are provided to explain channel information.

FIG. 2A illustrates frequency bands in which the CR terminal 100 communicates. The CR terminal 100 does not search all the frequency bands for an available channel, but searches a limited number of frequency bands for an available channel in consideration of waste of electric power and impossibility of actually receiving channel information in all the frequency bands.

As illustrated in FIG. 2A, it is assumed that frequency bands where the available channels are searched for by the CR terminal 100 are band A, band B, band C, and band D, band B is assigned to the TV 10-1, and band D is assigned to the radio 10-2.

Firstly, in order to obtain channel information from primary users, the CR terminal 100 broadcasts a channel information transmission request message. The primary users receive the channel information transmission request message, figure out information on channels in use, and generate channel information, and transmit the channel information to the CR terminal 100.

Figure 2B:
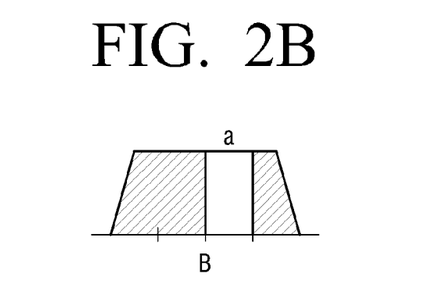

FIG. 2B illustrates channel information regarding a frequency band allocated to the TV 10-1. In FIG. 2B, the hashed area indicates channels used by the TV 10-1. In the frequency band assigned to the TV 10-1, channels except for channel a are in use. If the TV 10-1 receives a channel information transmission request message from the CR terminal 100, the TV 10-1 transmits channel information to the CR terminal 100. Consequently, the CR terminal 100 can see that channel a is available, from the received channel information of the TV 10-1.

Figure 2C:
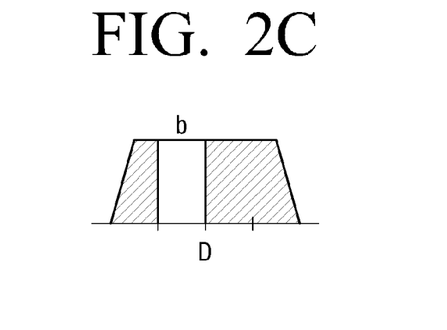

FIG. 2C illustrates channel information regarding a frequency band allocated to the radio 10-2. In the same manner as described above, if the radio 10-2 receives a channel information transmission request message from the CR terminal 100, the radio 10-2 transmits channel information to the CR terminal 100. Consequently, the CR terminal 100 can see that channel b is available, from the received channel information of the radio 10-2.

Figure 2D:
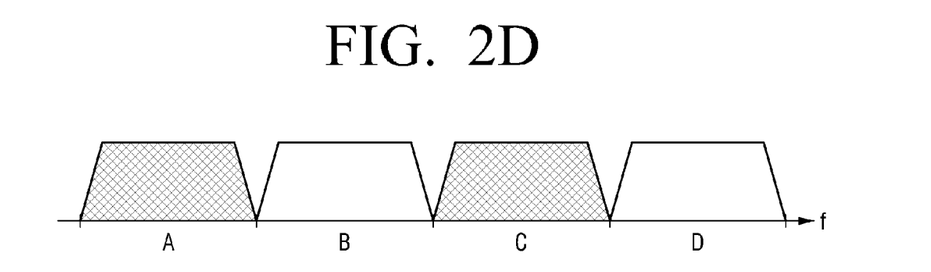

Not receiving channel information in response to the broadcast channel information transmission request message within a preset period of time, the CR terminal 100 directly searches a band through which channel information is not received. FIG. 2D illustrates bands to be directly searched by the CR terminal 100. Since the channel information is received from the TV 10-1 and the radio 10-2, the CR terminal 100 directly searches the remaining bands A and C except for band B assigned to the TV 10-1 and band D assigned to the radio 10-2 so as to extract channel information.

Figure 2E:
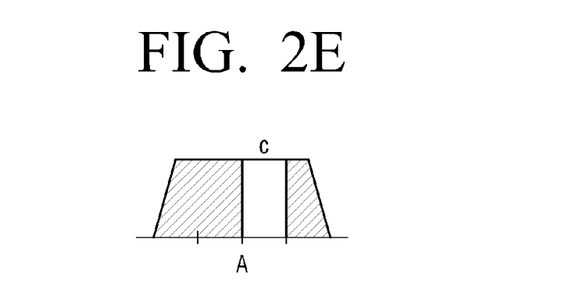

FIG. 2E illustrates channel information of a band directly searched by the CR terminal 100. As illustrated in FIG. 2E, the CR terminal 100 can see from direct search that channels except for channel c are all in use.

Figure 2F:
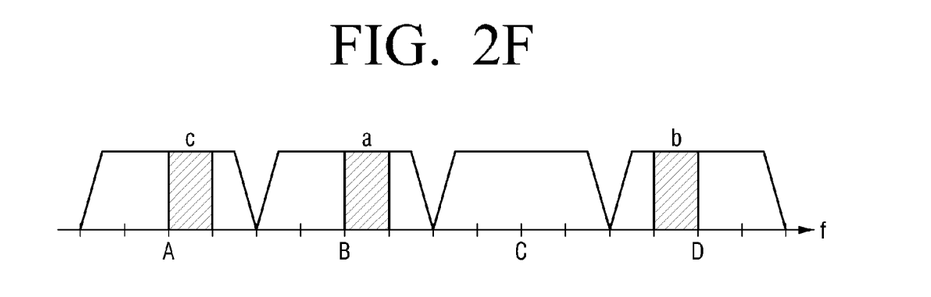

FIG. 2F illustrates available channels based on the channel information. The CR terminal 100 can see that there are available channels as illustrated in FIG. 2F, by combination of the channel information received from the primary users and the channel information of a directly searched band. Accordingly, the CR terminal 100 can perform communication using one of channels a, b and c.

In the above exemplary embodiment of the present invention, channel information is received or searched in a spatial aspect such as a preset frequency band, but the idea of the present invention can be applied even when channel information is received or searched in a temporal aspect. Detailed description is given with reference to FIGS. 3A and 3B.

Figure 3A:
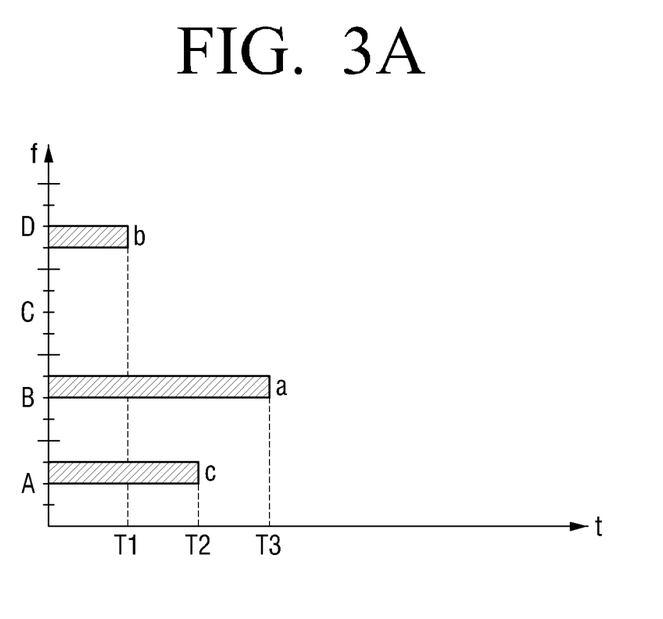
FIGS. 3A and 3B illustrate channel information in space and time aspects.
Figure 3B:
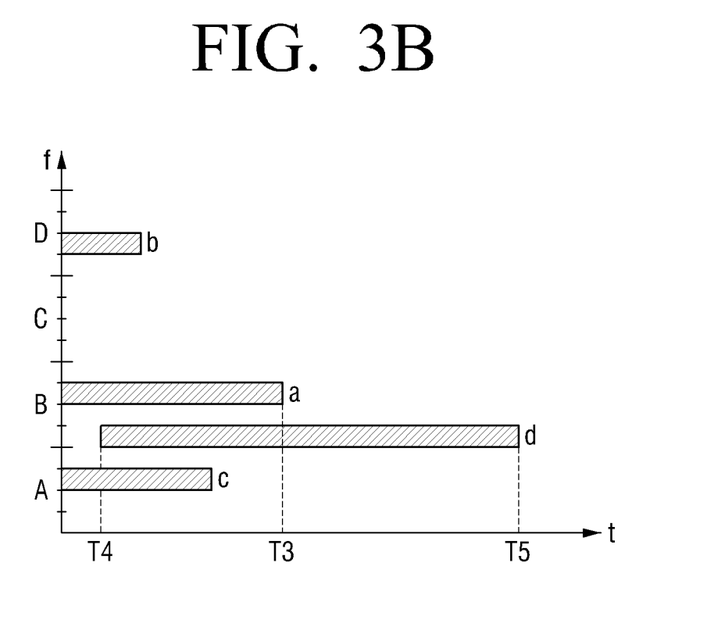

FIGS. 3A and 3B illustrate channel information in spatial and temporal aspects. As described above, the CR terminal 100 can see that (1) channel a is available in band B and channel b is available in band D by communication with the primary users, and that (2) channel c is available in band A by direct search.

Furthermore, as illustrated in FIG. 3A, the CR terminal 100 can see (1)' available time of available channels a and b by communication with the primary users, and (2)' available time of available channel c by direct search. Accordingly, the CR terminal 100 can determine an available channel to be used from among the available channels using information regarding the available time of the available channels.

For example, as illustrated in FIG. 3A, among the available channels, if available time of channel a is the longest, the CR terminal 100 selects channel a having the longest available time, and performs communication through channel a. Compared to channel b and channel c, the single channel can be used for a long time, resulting in lessening the inconvenience of changing a channel.

The CR terminal 100 can see following available channels as well as the current available channels (1) by communication with the primary users and (2)' by direct search. FIG. 3B illustrates that information that channel d is available as a following available channel is received from the TV 10-1 which is assigned band B.

Accordingly, the CR terminal 100 can perform communication by using one of channels a, b and c, and changing to channel d, or can begin communication through channel d after standing by until time T4. Therefore, if the CR terminal 100 receives information on following available channels, efficient use of available channels are enabled and array of choices to select a channel can widen.

The CR terminal 100 generates information on available channels changing over time (referred to hereinafter as the "available channel information"), and performs communication by altering a currently used channel using the available channel information.

Figure 4A:
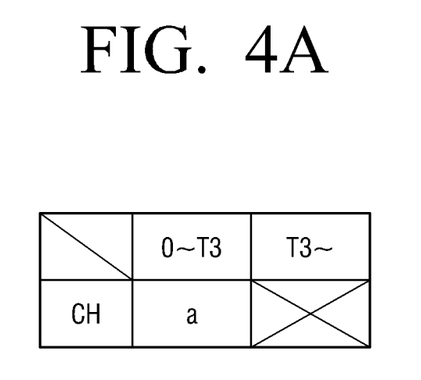
FIGS. 4A and 4B illustrate available channel information.
Figure 4B:
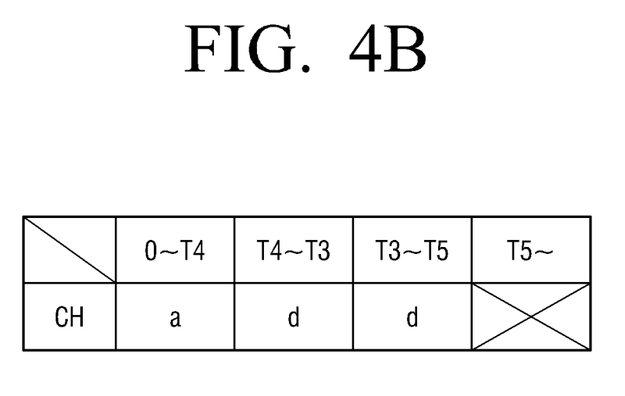

FIGS. 4A and 4B illustrate available channel information. More specifically, FIG. 4A indicates available channel information generated based on channel information illustrated in FIG. 3A, and FIG. 4B indicates available channel information generated based on channel information illustrated in FIG. 3B.

That is, the CR terminal 100 generates available channel information of FIG. 4A using channel information of FIG. 3A, and performs communication using channel a until time T3. In addition, the CR terminal 100 generates available channel information of FIG. 4B using channel information of FIG. 3B, and performs communication using channel a until time T4 and using channel d from time T4 until time T5.

Such channel information or such available channel information can be used if more channel information is not received or if the received channel information is not updated until time T3 or T5. Accordingly, if the CR terminal 100 receives changed channel information from a primary user, the CR terminal 100 determines available channels based on the changed channel information. To this end, if channel information is changed, the TV 10-1 and the radio 10-2 need to transmit the changed channel information to the CR terminal 100 even when not receiving a channel information transmission request message.

If the CR terminal 100 determines that interference occurs in the available channel in use, the CR terminal 100 must move to another available channel and maintain communication.

Figure 5:
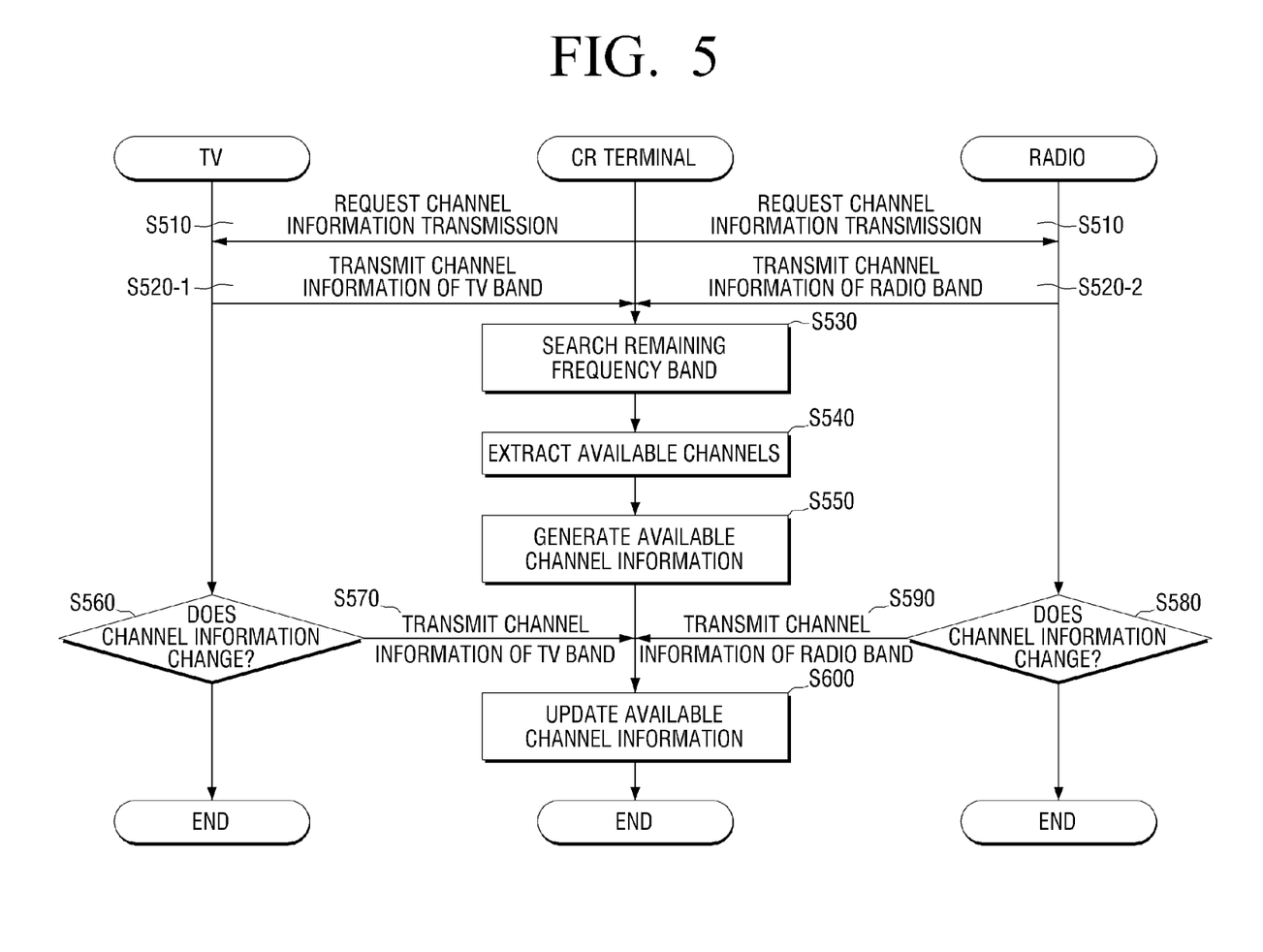
FIG. 5 is a flowchart illustrating a method for searching for available channels according to an exemplary embodiment of the present invention.

FIG. 5 is a flowchart illustrating a method for searching for available channels according to an exemplary embodiment of the present invention. In particular, FIG. 5 illustrates a method for searching for available channels by communication with primary users as illustrated in FIG. 1A.

The CR terminal 100 broadcasts a channel information transmission request message so as to obtain channel information from the primary users (S510). The TV 10-1 receives the channel information transmission request message and transmits channel information regarding a channel in use in a frequency band assigned to the TV 10-1 to the CR terminal 100 (S520-1). In addition, the radio 10-2 receives the channel information transmission request message and transmits channel information regarding a channel in use in a frequency band assigned to the radio 10-2 to the CR terminal 100 (S520-2).

The channel information is transmitted using a channel which is not in use. For example, in operation S520-1, the TV 10-1 which receives the channel information transmission request message may transmit the channel information through a channel which is not in use in the frequency band assigned to the TV 10-1. In the same manner, in operation S520-2, the radio 10-2 which receives the channel information transmission request message may transmit the channel information through a channel which is not in use in the frequency band assigned to the radio 10-2.

Such channel information must have a signal format which is previously set between the CR terminal 100 and the primary users. A time division method, a frequency division method, or an Orthogonal Frequency Division Multiplexing (OFDM) method may be used as the promised signal format, or an identifier indicating a promised signal format may be included in a packet.

Furthermore, transmission of such channel information may be performed using a communication method which is previously set between the CR terminal 100 and the primary users or using a communication unit which the CR terminal 100 and the primary users have in common.

For example, if use of a Bluethooth method or a wireless local area network (LAN) method is set between the CR terminal 100 and the primary users, the TV 10-1 may transmit channel information to the CR terminal 100 using a Bluethooth method, and the radio 10-2 may transmit channel information to the CR terminal 100 using a wireless LAN method.

In addition, if available communication methods of the CR terminal 100 are wireless LAN and Bluetooth, and if available communication methods of the TV 10-1 are Bluetooth and infrared communication, the CR terminal 100 can communicate with the TV 10-1 using the Bluetooth method.

These are merely exemplary embodiments of the present invention for convenience of description, and the technical idea of the present invention is not limited thereto.

Subsequently, the CR terminal 100 searches the remaining bands except for the band assigned to the TV 10-1 and the band assigned to the radio 10-2 (S530). The CR terminal 100 extracts available channels using the channel information received from the TV 10-1, the channel information received from the radio 10-2, and the search result of the remaining bands except for the band assigned to the TV 10-1 and the band assigned to the radio 10-2 (S540). In addition, the CR terminal 100 generates available channel information using the extracted available channels (S550).

Next, after transmitting the channel information to the CR terminal 100, the TV 10-1 determines whether or not the channel information changes (S560), and if the channel information changes (S560-Y), the TV 10-1 transmits the changed channel information to the CR terminal 100 (S570). In the same manner, after transmitting the channel information to the CR terminal 100, the radio 10-2 determines whether or not the channel information changes (S580), and if the channel information changes (S580-Y), the radio 10-2 transmits the changed channel information to the CR terminal 100 (S590).

The CR terminal 100 updates the available channel information using the changed channel information received from the TV 10-1 and the radio 10-2 (S600).

Accordingly, the CR terminal 100 can extract available channels by communication with the primary users without accessing the Internet.

Figure 6:
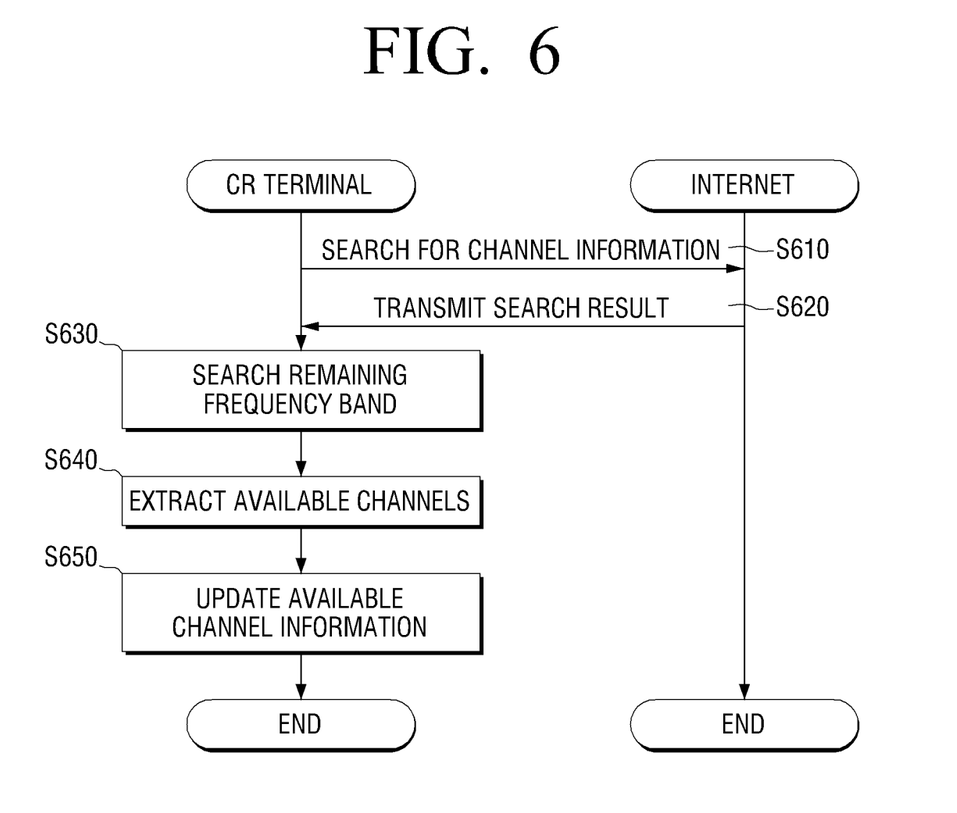
FIG. 6 is a flowchart illustrating a communication method according to another exemplary embodiment of the present invention.

FIG. 6 is a flowchart illustrating a communication method according to another exemplary embodiment of the present invention. In particular, FIG. 6 illustrates a method for searching for available channels by accessing the Internet as illustrated in FIG. 1B.

Firstly, the CR terminal 100 accesses the Internet, searches for channel information (S610), and receives the found channel information (S620). That is, the CR terminal 100 searches for information on frequency bands assigned to the primary users in a region in which the CR terminal 100 is positioned, and information on channels which are not used by the primary users from among the assigned frequency bands. The information on frequency bands assigned to the primary users and the information on channels which are not used by the primary users depends on the region.

For example, in a country, a frequency band assigned to a TV is band B including channel a1, channel a2, channel a3, and channel a4, and region 1 does not use channel a1 and region 2 does not use channel a3. In general, such channel information is predetermined by the government, so the CR terminal 100 can search for available channels of a region in which the CR terminal 100 is currently positioned through the Internet.

If available channels in only a portion of frequency bands are mentioned in the Internet, the CR terminal 100 searches for the remaining frequency bands from among preset frequency bands (S630). The CR terminal 100 extracts available channels using the channel information obtained through the Internet and the search result of the remaining frequency bands (S640).

Subsequently, the CR terminal 100 updates the available channel information by periodically accessing the Internet or searching for channel information or the remaining frequency bands based on a particular case such as when the region in which the CR terminal 100 is positioned changes (S650).

Accordingly, the CR terminal 100 can receive channel information with greater ease and greater convenience without communication with the primary users, and also can obtain channel information of primary users having no communication unit.

Figure 7:
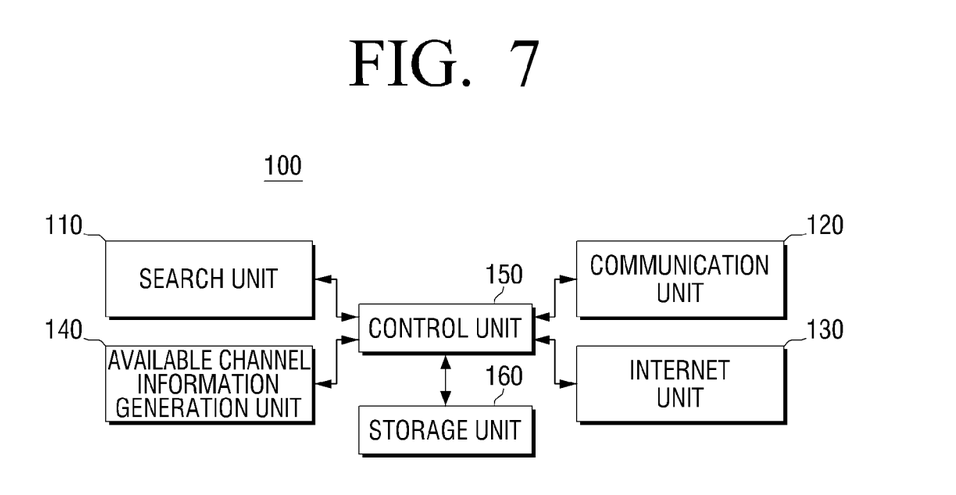
FIG. 7 is a schematic block diagram illustrating a configuration of a CR terminal 100 according to an exemplary embodiment of the present invention.

FIG. 7 is a schematic block diagram illustrating a configuration of the CR terminal 100 according to an exemplary embodiment of the present invention. The CR terminal 100 according to an exemplary embodiment of the present invention receives channel information by communicating with primary users or accessing the Internet, and searches for available channels using the received channel information.

The CR terminal 100 may include a search unit 110, a communication unit 120, an Internet interface 130, an available channel information generation unit 140, a control unit 150, and a storage unit 160.

The search unit 110 searches bands or channels within a preset frequency range, and determines the use of bands or channels within the preset frequency range. The search unit 110 transmits the determination result regarding the use to the control unit 150.

The communication unit 120 enables the CR terminal 100 to communicate with primary users, a CR base station, or another CR terminal. In particular, the communication unit 120 broadcasts channel information transmission request message and receives channel information in response to the channel information transmission request message from the primary users. Through extracted available channels, the communication unit 120 communicates with a CR base station or another CR terminal. The communication unit 120 transmits channel information received from the primary users to the control unit 150.

The Internet interface 130 is a path for connecting the CR terminal 100 to the Internet.

The available channel information generation unit 140 generates available channel information using the determination result of the search unit 110 regarding the use of channel and the channel information received through the communication unit 120 according to the control of the control unit 150.

The control unit 150 controls the overall operation of the CR terminal 100. In particular, the control unit 150 controls the available channel information generation unit 140 to generate available channel information using the determination result of the search unit 110 regarding the use of channel and the channel information received through the communication unit 120 according to the control of the control unit 150, and controls the CR terminal 100 to maintain communication with the CR base station or another CR terminal by changing a channel using the generated available channel information.

The storage unit 160 stores diverse program information to operate the CR terminal 100, the received channel information, and the extracted available channel information. The storage unit 160 may be implemented as a flash memory.

Accordingly, the CR terminal 100 can more rapidly search for available channels and use available channels in a frequency band assigned to a wireless communication device, so wireless resources can be more efficiently used.

Figure 8:
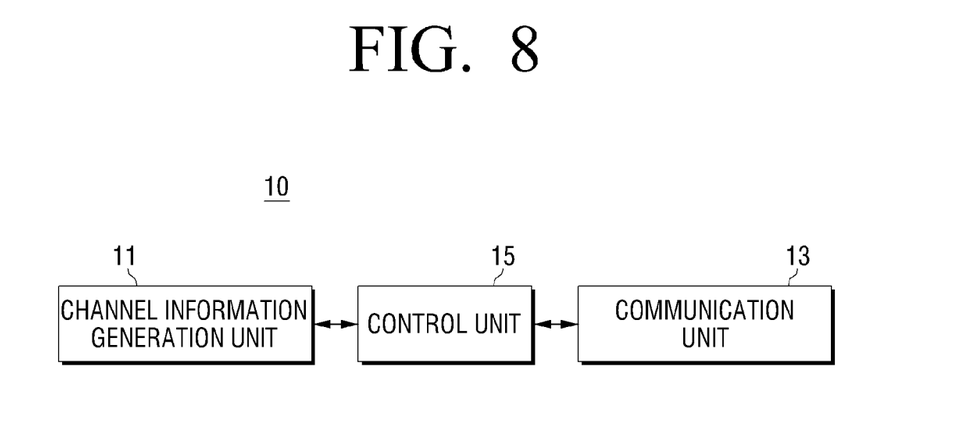
FIG. 8 is a schematic block diagram illustrating a configuration of a primary user 10 according to an exemplary embodiment of the present invention.

FIG. 8 is a schematic block diagram illustrating a configuration of a primary user 10 according to an exemplary embodiment of the present invention. By communicating using white space, primary user 10 provides the CR terminal 100 with channel information so that the CR terminal 100 can use a channel which is not in use in a frequency band assigned to the primary user 10.

The primary user 10 may include a channel information generation unit 11, a communication unit 13, and a control unit 15.

If the channel information generation unit 11 receives a channel information transmission request message from the CR terminal 100 through white space, the channel information generation unit 11 generates information on a channel which is not in used in the assigned frequency band, and transmits the generated channel information to the control unit 15.

The communication unit 13 enables the primary user 10 to receive the channel information transmission request message from the CR terminal 100 and transmit the generated channel information to the CR terminal 100.

The control unit 15 controls the overall operation of the primary user 10 to provide the CR terminal 100 with white space.

Therefore, limited wireless resources can be efficiently used.

As can be appreciated from the above description, the CR terminal 100 is directly connected to the Internet server. However, the technical idea of the present invention can be applied even when the CR terminal 100 uses another device which is connected to the Internet such as a personal computer connected to the Internet or a cell phone using the Internet.

As can be appreciated from the above description, the CR terminal 100 receives channel information from primary users, searches for available channels, and communicates using an available channel. This is merely an exemplary embodiment of the present invention for convenience of description. The technical idea of the present invention can be applied even when the CR terminal 100 receives channel information from primary users, searches for available channels, and transmits available channel information to another CR terminal, and another CR terminal communicates using an available channel. This means that a CR base station searching for an available channel and a CR terminal using the available channel can be separated.

As can be appreciated from the above description, only channel information is transmitted from the primary user to the CR terminal 100, but this is merely an exemplary embodiment of the present invention for convenience of description. The technical idea of the present invention can be applied even when information on a channel state or channel characteristics as well as channel information is transmitted.

As can be appreciated from the above description, the CR terminal 100 requests channel information first, but this is merely an exemplary embodiment of the present invention for convenience of description. The technical idea of the present invention can be applied even when primary users transmits channel information to the CR terminal 100 periodically or whenever the channel information changes even though the CR terminal 100 does not request channel information first.

As can be appreciated from the above description, the CR terminal 100 which is not assigned a frequency band uses the communication method according to the exemplary embodiments of the present invention, but this is merely an exemplary embodiment of the present invention for convenience of description. The technical idea of the present invention can be applied to a device which is assigned its own frequency band so as to use a channel which is not in use from among a frequency band assigned to another device.

Therefore, since the CR terminal 100 uses an available channel in consideration of the primary users, interference between devices using limited wireless resources can be avoided. Furthermore, a portion of frequency bands rather than all the frequency bands is searched, so available channels can be more rapidly found. In addition, the user of available channels in frequency bands assigned to wireless communication devices enables wireless resources to be more efficiently used. Finally, the CR terminal 100 directly receives information on available channels in frequency bands assigned to wireless communication devices from the wireless communication devices, so available channels can be more rapidly obtained.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A communication method performed by a communication device, the method comprising:

receiving a message including channel information indicating a channel used by at least one external device in a frequency band assigned to the at least one external device, the frequency band including a plurality of channels;

generating, by a control unit, candidate available channels in the frequency band assigned to the at least one external device based on the channel information, wherein the candidate available channels comprise at least one of a channel not used by the at least one external device, among a plurality of the channels in the frequency band assigned to the at least one external device;

searching, by the control unit, for candidate available channels in a remaining frequency band that is not assigned to the at least one external device;

determining, by the control unit, available channels using a combination of the generated candidate available channels and the candidate available channels from the search result; and performing communication through one of the determined available channels, wherein the receiving operation comprises receiving a message including updated channel information from the at least one external device when the channel used by the at least one external device is changed, and the generating operation updates the candidate available channels to at least one of a channel not currently used by the at least one external device based on the received message including the updated channel information, wherein the determining available channels comprises determining an available channel as a channel, from among the candidate available channels, having a longest available time based on information on the candidate available channels which changes over time, and wherein the performing communication comprises performing communication by changing a channel in use to the determined available channel.

2. The communication method according to claim 1, wherein the receiving operation comprises receiving the channel information from the at least one external device through a channel which is not used by the at least one external device, in the frequency band assigned to the at least one external device.

3. The communication method according to claim 1, further comprising:

generating the information on candidate available channels which changes over time based on the channel information and the search results.

4. The communication method according to claim 3, wherein the available channel is one of a plurality of available channels, and the performing communicating by changing the channel in use comprises performing communication by changing the channel in use to one of the plurality of available channels.

5. The communication method according to claim 1, wherein the channel used by the at least one external device varies according to a region, and the receiving comprises receiving the channel information for a current region through the Internet.

6. The communication method according to claim 1, wherein the at least one external device comprises a television (TV) or a radio.

7. A wireless communication device, comprising:

a communication unit which receives a message including channel information indicating a channel used by at least one external device, in a frequency band assigned to the at least one external device, the frequency band including a plurality of channels; and a control unit which generates candidate available channels in the frequency band assigned to the at least one external device based on the channel information, wherein the candidate available channels comprise at least one of a channel not used by the at least one external device, among a plurality of the channels in the frequency band assigned to the at least one external device, searches for candidate available channels in a remaining frequency band that is not assigned to the at least one external device, determines available channels using a combination of the generated candidate available channels and the candidate available channels from the search result, and performs communication through one of the determined available channels, wherein when the channel used by the at least one external device is changed, the communication unit receives a message including updated channel information from the at least one external device, and the control unit updates the candidate available channels to at least one of a channel not currently used by the at least one external device based on the received message including the updated channel information, and wherein the control unit determines an available channel as a channel, from among the candidate available channels, having a longest available time based on information on the candidate available channels which changes over time, and sets the determined available channel as a channel to be used by the wireless communication device.

8. The wireless communication device according to claim 7, wherein the control unit receives the channel information from the at least one external device through a channel which is not used by the at least one external device in the frequency band assigned to the at least one external device.

9. The wireless communication device according to claim 7, further comprising:

an available channel information generation unit which generates the information on the candidate available channels which changes over time based on the channel information and the search results.

10. The wireless communication device according to claim 9, wherein the available channel is one of a plurality of available channels, and the control unit sets one of the plurality of available channels as the channel to be used by wireless communication device.

11. The wireless communication device according to claim 7, further comprising:

an Internet interface through which the wireless communication device accesses the Internet, wherein the channel used by the at least one external device varies according to a region, and the control unit receives channel information for a current region through the Internet.

12. The wireless communication device according to claim 7, wherein the at least one external device comprises a television (TV) or a radio.

13. A wireless communication system, comprising:

at least one first device which generates a message including channel information indicating a channel in use in an assigned frequency band of the at least one first device, the frequency band including a plurality of channels, and transmits the message in response to receiving a channel information transmission request; and at least one second device which transmits the channel information transmission request to the at least one first device, receives the message including the channel information, generates candidate available channels in the frequency band assigned to the at least one external device based on the channel information, wherein the candidate available channels comprise at least one channel not used by the at least one external device, among a plurality of the channels in the frequency band assigned to the at least one external device, searches for candidate available channels in a remaining frequency band that is not assigned to the at least one external device, determines available channels using a combination of the generated candidate available channels and the candidate available channels from the search result, and performs communication through one of the determined available channels, wherein when the channel in use in the assigned frequency band is changed, the at least one first device transmits to the at least one second device a message including updated channel information, and the at least one second device updates the candidate available channels to at least one of a channel not currently used by the at least one external device based on the received message including the updated channel information, and wherein the at least one second device determines the available channels as channels, from among the candidate available channels, having longest available times based on information on the candidate available channels which changes over time, and sets the determined available channels as channels to be used by the wireless communication device.

* * * * *